United States Patent [19]
Rahl

[11] 3,778,840
[45] Dec. 11, 1973

[54] DISPOSABLE FIBER TIP MARKER

[75] Inventor: William R. Dahl, Lakewood, Colo.

[73] Assignee: Honeywell Inc., Minneapolis, Minn.

[22] Filed: Sept. 14, 1971

[21] Appl. No.: 180,403

[52] U.S. Cl.................. 346/30, 346/49, 346/140
[51] Int. Cl............................ G01d 9/40, G01d 9/30
[58] Field of Search.................... 346/140, 29, 49, 346/30

[56] References Cited
UNITED STATES PATENTS

| | | | |
|---|---|---|---|
| 3,638,228 | 1/1972 | Hill | 346/29 X |
| 2,325,451 | 7/1943 | Wait | 346/49 X |
| 3,247,519 | 4/1966 | Sihvonen | 346/140 |
| 3,360,799 | 12/1967 | Polster | 346/29 |
| 3,373,435 | 3/1968 | Strong | 346/140 |
| 3,380,065 | 4/1968 | Alpert et al. | 346/29 |
| 3,611,430 | 10/1971 | Watchorn | 346/140 |

Primary Examiner—Joseph W. Hartary
Attorney—Arthur H. Swanson et al.

[57] ABSTRACT

Disposable fiber tip marker means for a flat bed plate type recorder includes first and second markers each comprising a fiber tip pen and cartridge, each cartridge having a flat base wall which is disposed at an angle of 17° with respect to the plane of a recorder chart. The fiber tip pen associated with each cartridge extends at substantially a right angle from the related base wall. Each cartridge also includes a second flat wall which extends at an obtuse angle from said base wall. The cartridges are arranged with each of said second walls disposed in adjacent and parallel planes and with the fiber tip pens thereof extending substantially to said planes whereby each fiber tip pen is capable of recording on substantially the same time line of said chart.

8 Claims, 4 Drawing Figures

INVENTOR.
WILLIAM R. DAHL

PATENTED DEC 11 1973 3,778,840

INVENTOR.
WILLIAM R. DAHL
BY John Shaw Stevenson
AGENT

DISPOSABLE FIBER TIP MARKER

BACKGROUND OF THE INVENTION

The aforementioned invention in ink cartridges having converging fiber pen tips can be beneficially employed to advantage in recorders commonly referred to as X-Y-Y' recorders or in other words precision instruments that are used to simultaneously plot two vertical (Y and Y' axes) input signals in relation to a single horizontal (X axis) signal such as an increment of time or another independent variable on a cartesian coordinate graph.

PROBLEM

When two pens of the aforementioned X-Y-Y' recorders have heretofore been used to record two different input signals in the form of an XY and XY' trace on a chart it has been difficult to make an accurate rapid determination of the differences that exist between the Y-coordinate of the XY trace and Y-coordinate of XY' trace at any one instant of recording time. This difficulty arises due to the fact that pens have heretofore been required to be positioned for recording on different time lines because the pens had to be positioned in a sufficiently spaced apart manner with resepct to one another in order that they could pass one another as they move between different Y-values on the chart.

DESCRIPTION OF PRIOR ART

The Beaumont et al. U.S. Pat. No. 2,936,207 covers the use of a plurality of ball point pens each of which contain a different color ink. These pens are positioned at different angles with respect to one another so that they can be moved in a prescribed sequence by a magnetic device one at a time into and out of contact with a paper. This arrangement allows a series of different measured variables to be distinguished from one another by the color its ball point pen imprints on the paper while the other pens are disengaged with the paper. When the pen activating circuits are employed to move Beaumont et al. differently colored pens one at a time into engagement with a chart, it has been found that it is difficult for each successive pen to be brought into contact with the chart at exactly the same point. This is due to the movement of the pen carriage that occurs during the lapse in time between the contraction of one color pen from the paper and the movement of the other color pen into contact therewith. The Beaumont et al. U.S. Pat. No. 2,936,207 describes a multicolored recorder of the type just described in which the aforementioned trace separation problem is present. In his attempt to eliminate this problem, Beaumont et al. finds it necessary to go to the added expense of supplying additional electrical components so that an additional small constant voltage will be added to the input of his servo motors that are actuating the carriage on which his pens are adjustably mounted.

The construction of each of the unitary cartridges and fiber tips that are mounted on two separate carriages to be hereinafter described in detail, on the other hand, does allow each of these fiber pens to be brought in substantially point to point contact with one another while they are recording a trace on a chart and without need of additional equipment to supply a small constant voltage.

SUMMARY OF THE INVENTION

To overcome the previously referred to problem, a fiber tip pen is employed to protrude downwardly in a tilted direction from a tapered underside surface of each one of two ink filled cartridges and into substantially point to point contact with one another on a chart while these unitary cartridge-fiber tipped pen markers are supported for movement on separate carriages.

With the aforementioned arrangement, substantially no undesired separation along the X axis can occur between the two fiber tipped pens while the same or different simultaneous changes occur in the Y and Y' value of the variable being traced on the chart by each pen. In this way the difference in magnitude between the plotted Y value of one fiber pen tip and the other can be rapidly determined by observing a Y line on the chart.

A better understanding of the present invention may be had from the following description when read in connection with the accompanying drawings in which.

Figure 1:
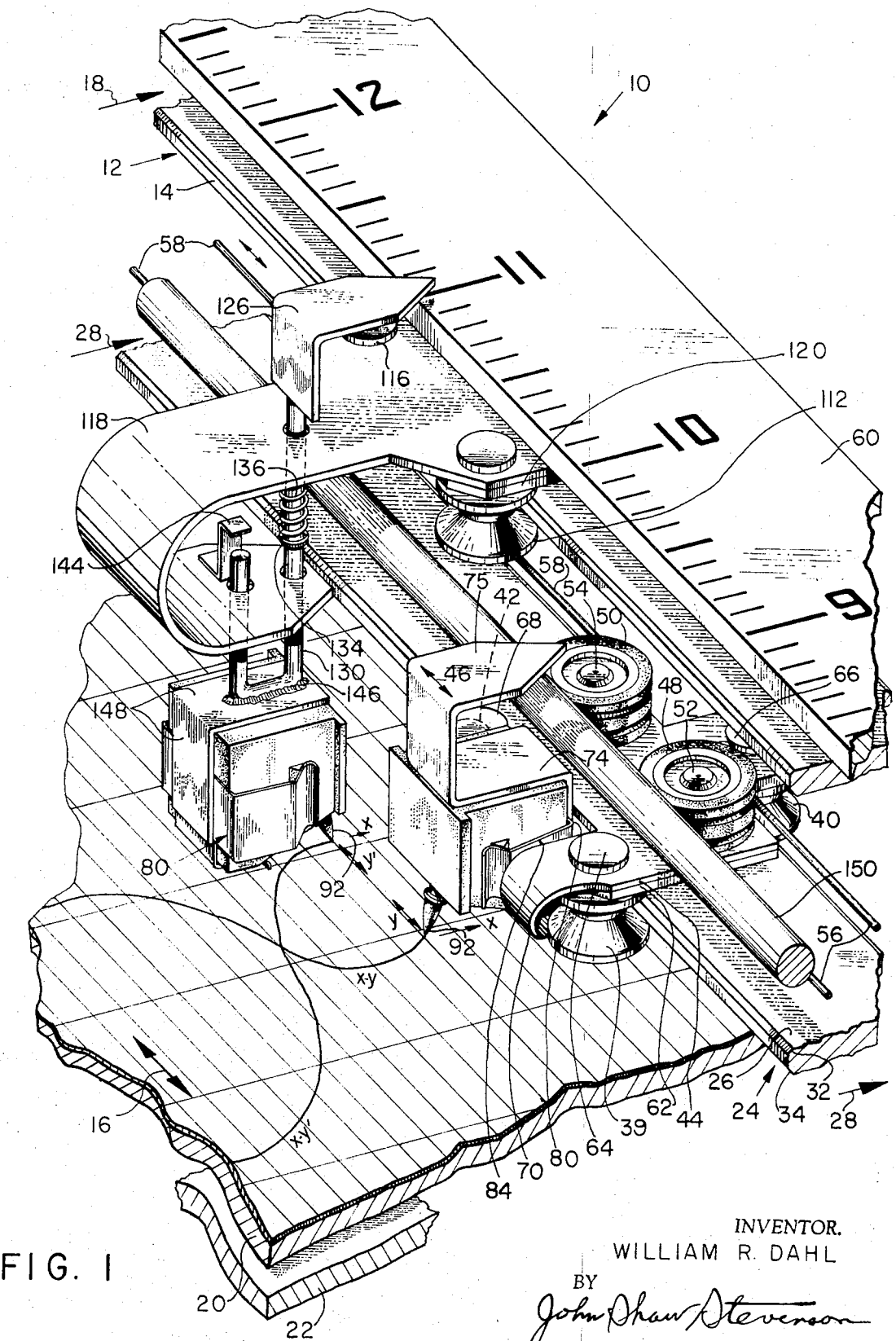
FIG. 1 is a perspective view showing the unique, disposable, unitary tapered fiber tip pen and ink cartridge forming a marker in a recording position and how a single one of these markers is respectively mounted for movement on an upper and lower carriage of an X-Y-Y' recorder.
Figure 2:
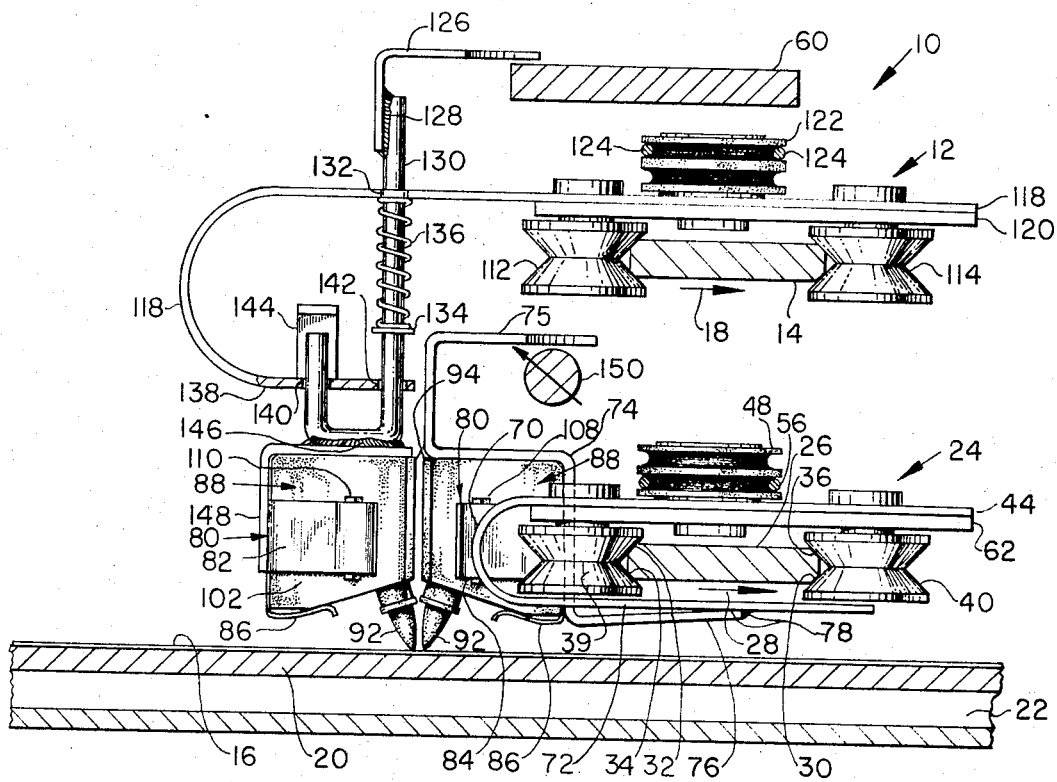
FIG. 2 is an elevation view taken from the lower right end of FIG. 1.

FIG. 1 and 2 show an X-Y-Y' recorder pen 10. This type of recorder has an upper pen carriage assembly 12 that is comprised of a carriage 14 that extends across the Y axis of a chart 16 and which is supported in a conventional way at its ends on the top and bottom portions of the recorder and for movement along the X axis in the manner indicated by the arrow 18. The chart 16 is retained in a fixed position on plate 20 which forms the top position of a vacuum hold down chamber 22. A conventional servo driven pulley and tackle connection, not shown, is used to effect movement of the carriage assembly 12 in the aforementioned manner and at a travel rate that varies in accordance with, for example, a preselected increment of time or other independent variable.

The X-Y-Y' recorder pen is also comprised of a lower pen carriage assembly 24 that has a carriage 26 that also extends across the Y axis of the chart 16 and which is supported at its end on another top and bottom portion of the recorder and for movement along its X axis in the manner indicated by the arrow 28.

The same previously referred to conventional servo motor driven pulley and tackle connection, not shown, can also be employed to effect movement of the lower carriage assembly 24 across the X axis at, for example, the same incremental travel rate at which the first carriage assembly 12 moves across the chart 16.

The carriage portion 26 of the lower pen carriage assembly 24 has four beveled edges 30, 32, 34, 36. These edges 30 – 36 provide rail surfaces along which the three identical rollers 39, 40, 42 on pen trolley plate 44 can travel along the Y axis of the carriage 26.

Each one of a pair of pulleys 48, 50 are shown mounted for rotatable movement on an associated stub shaft 52, 54 that in turn protrude upwardly from the plate 46. A conventional servo motor driven drum and a pulley drive unit, not shown, is employed to ease up on the force it applies by way of the loop of wire 56 to the pulley 48 about which it is wrapped while it applies an increase in force by way of the loop of wire 58 to the pulley 50. When the servo motor driven drum and pulley drive unit, not shown, is operated in the opposite direction, the forces applied to the pulleys 48 and 50 by their associated wires 56, 58 will be the reverse of that just described.

In this way, it can be seen that when the value of the Y input signal is increased, the pulleys 48, 50 and the pen trolley plate 44 will be moved upward from its present position as shown in FIG. 1 to a higher value shown on the scale 60 and when the Y input signal is decreased it will cause the pen trolley plate 44 to be moved to a lower value on scale 60.

The scale 60 extends across the entire length of the carriage 26, and as shown, is in spaced apart relation therewith. Although not shown, thus scale 60 has end portions that are connected to the ends of the carriage 14 so that it can be jointly moved with the carriage 14 along the X axis and in the direction of the arrow 18.

The pen trolley plate 44 is shown having a back up plate 62 in order to provide additional support for the stub shafts 64, 66, 68 associated with the rollers 39 – 42 and the stub shafts 52, 54 associated with the pulleys 48, 50.

The left end of the pen trolley plate 44 is looped in spaced apart relationship about each of the rollers 39, 42 in the same manner as the looped portion 70 that is wrapped about the roller 39 and terminates in a straight elongated portion 72 that extends to the right and under the carriage 26 as is best shown in FIG. 2.

A bracket 74 is shown having a lower end portion 76 connected by a suitable welding material 78 to the right end of the straight line portion 72 of the pen trolley plate 44.

The looped and straight line portion 70, 72 of the plate 44 will therefore provide a spring support that will apply a force to continuously bias the bracket 74 in a downward direction.

Figures 3, 4:
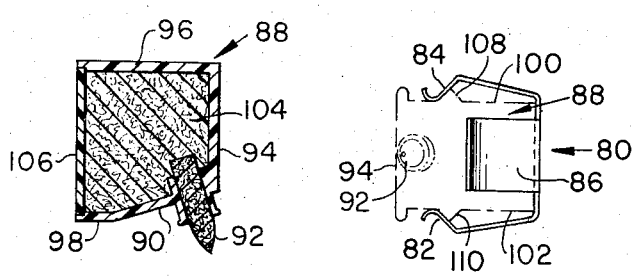
FIG. 3 is a bottom plan view of the cartridge retaining plate with the unique disposable ink cartridge and fiber tip unit shown mounted thereon and FIG. 4 shows a cross section of each of a pair of the unitary ink cartridges and fiber tip pens that are shown in FIG. 1 and 2.

The upper end of the bracket 74 has a pointer 75 for moving across and below the scale 60. A cartridge retaining plate 80 is fixedly connected by suitable welding material to the inner wall surface of a lower vertical portion of the bracket 74. The attached portion of the carriage retaining plate 80 has three spring clip portions 82, 84, 86 extending outward therefrom as is best shown in FIG. 3. A unique unitary readily disposable ink cartridge 88 having a tapered bottom surface 90 at approximately a 17° angle to the horizontal and a fiber tip pen 92 is purposely positioned in a substantially perpendicular manner from the tapered surface 90 as is shown in detail in FIG. 4. The right side portion 94, top portion 96, bottom portion 90, 98 and the remaining front and back portion 100, 102 form a unitary part of the cartridge 88 into which an upper cylindrical end of the fiber tip 92 protrudes into a fibrous ink saturated pad 104.

The unitary part of the cartridge 88 and a separate wall 106 that is connected thereto by a translucent cement are purposely made of translucent material, for example, a plastic material marketed under the trade name of POLYETHYLENE.

By gripping the outer protruding end portions of the wall 94 between two fingers the disposable ink cartridge 88 and fiber tip pen 92 can readily be forced into or removed from the engaged position with the spring clips 82, 84, 86 of the cartridge retaining plate 80 which is shown in FIGS. 1, 2 and 3.

Triangular shaped ridges 108, 110 formed on the front and back surfaces 100, 102 of the cartridge 88 are employed to retain the cartridge 88 in firm engagement with the spring clips 82, 84 in the manner as is best shown in FIG. 3.

The upper pen carriage assembly 12 has a carriage 14 and three rollers, for example, 112, 114, 116 that carry a pen trolley plate 118 and its back up plate 120 along the carriage 14 in a manner similar to the way the rollers 39 – 42 carry the pen trolley plates 44, 62 along its associate carriage 26.

FIG. 2 shows one pulley, 122 of a pair of aligned pulleys that are mounted on the pen trolley plate 118 of the upper pen carriage 14 and a suitable number of wires, for example, 124, connected to a second servo motor, not shown, to move these pulleys and their associated trolley plate 18 in either direction along the carriage 14. The manner in which this latter servo drive of the upper trolley plate 118 is accomplished is similar to that which was previously described for the servo motor wire drive 56, 58 and the pulleys 48, 50 which have been previously described for the lower carriage assembly 24.

A pointer 126 is shown fixedly connected by suitable welding material 128 to the upper end of the J-shaped rod 130. The upper end of the rod 130 is shown protruding through a wall 132 forming an aperture in the pen trolley plate 118. A retaining ring 134 is also shown in fixed realtion with the lower portion of the rod 130 and a helical compression spring 136 is shown extending between the ring 134 and the underside surface of the upper portion of the trolley plate 118.

A lower portion 138 of the trolley plate 118 is shown having two wall portions 140, 142 which form apertures therein to accommodate the vertical up and down motion of the J-shaped rod 130 therein.

The lower end portion 130 of the trolley plate 118 has a Z-shaped pen stop plate 144 fixedly mounted thereon as is best shown in FIG. 1. The top portion of the plate 144 is shown located immediately above the lower end of the J-shaped rod 130.

The base of the J-shaped rod 130 is connected by suitable welding material 146 to an inverted L-shaped bracket 148. This bracket 148 is similar in shape to the lower end portion of the bracket 74, previously described, and has a cartridge retaining plate 80 and associated spring clip portions 82 – 86 fixedly connected to it in the same way that the plate 80 and its associated spring clip portions 82 – 86 are attached to the lower end portion of the bracket 74 as previously described.

The shape of the bracket 148 and the ink cartridge retaining plate 80 thus provide a means into which the unique, unitary cartridge 88 can be rapidly inserted and replaced for transversing movement with the pen trolley plate 118 on the carriage 14.

From the aforementioned description it can be seen that the coil spring 136 will maintain a downward force by way of the parts 134, 130, 148 on the cartridge 88 so that its associated fiber tip pen 92 is maintained in spring bias contact with the chart 16 while it is moved across the Y-axis of this chart to inscribe an X-Y' plot thereon.

It can also be seen from the aforementioned description that the looped and straight line portions 70, 72 of the pen trolley plate 44 are arranged to maintain a spring force in a downward direction on the bracket 74, so that the unitary cartridge 88 retained therein by the spring clips 82 – 86 of the retaining plate 80 will hold the pen 92 in a spring bias contact with the chart 16. From the aforementioned description, it can be seen that the unique unitary cartridge 88 and pen 92 which forms a readily disposable fiber tip marker can be moved across the Y-axis of a chart on its carriage 14 in the aforementioned manner to inscribe an X-Y plot thereon.

An important result of having two converging markers having the same unitary cartridge 88 with a sloping surface 90 and a fiber tip pen 92 protruding therefrom at a tilted angle to the chart 16 is that the writing surface of each one of these markers can be made to travel substantially along the same Y-line of the chart so that separate analog values (X-Y and XY') can be inscribed thereon. In this way no correction is therefore needed when noting the difference in any two values of the Y and Y' value on the chart as each of these fiber tip pens 92, 92 are moved along the X axis at a preselected time rate or at a rate that depends upon another independent variable.

The sloping surface 90 also enhances the flow of ink to the recording surface in a tilted direction away from the cartridge.

The embodiments of the invention in which an exclusive property or privilege is claimed are defined as follows:

1. A marker comprising a single disposable fiber tip pen and marking medium containing cartridge, a first substantially plane surface forming a first outer base wall of said cartridge, said fiber tip pen being positioned to protrude away from said first wall so that substantially a right angle is formed between the elongated longitudinal axis of said pen and said first wall and said cartridge having at least one additional substantially plane outer wall that is positioned to extend at an obtuse angle away from its said first mentioned wall and wherein said writing tip portion of said fiber tip pen is arranged to extend substantially to the plane that includes said second mentioned wall of the cartridge.

2. Marking means comprising a first marker for making a first trace on a recording medium, said marker having a disposable filter tip pen and marking medium containing cartridge, a first substantially plane surface forming a first outer base wall of said cartridge, said fiber tip pen being positioned to extend away from said first wall so that substantially a right angle is formed between the elongated longitudinal axis of said pen and said first wall, said cartridge having at least one additional substantially plane outer wall that is positioned to extend at an obtuse angle from its said first mentioned wall and further comprising a second marker similar to said first marker for marking a second trace on said recording medium, said second marker having the second outer wall thereof disposed in a plane that is adjacent and parallel to the plane that includes the second outer wall of the first marker, each of the fiber tip pens of said first and second markers extending substantially to the plane that includes its associated second wall.

3. The marking means as defined in claim 2 wherein the said first outer wall of each of said markers forms a lower part of the cartridge of which it is a part and is arranged to be inclined at an angle of substantially 17° with respect to said recording medium.

4. The markers as defined in claim 2 wherein the first outer wall of each cartridge forms a base portion of which it is a part, said second mentioned outer wall of each cartridge forms an end portion of which it is a part, and each of said cartridges having separate integral finger gripping portions extending from opposite side portions thereof to expedite separate insertion of each of said markers into and withdrawal from separate associated marker retaining plates of a recorder.

5. The apparatus as defined in claim 2 wherein said first and second outer walls respectively form a base and an end portion of each of the said cartridges and wherein two opposite sides of each cartridge has elongated ridges extending therefrom that are of a triangular configuration to retain each cartridge and its associated fiber tip pen in form non rotatable contact with an associated cartridge retaining spring clip which is mounted for movement along a different one of two carriages of a recorder.

6. Recorder means comprising first and second markers, each adapted for movement by an individually associated carriage along a chart for recording the changes in the magnitudes of variable quantities, each of said markers comprising a disposable fiber tip pen and marking medium containing cartridge, a first substantially plane surface forming a first outer base wall of said cartridge, said fiber tip pen being positioned to extend away from said first wall so that substantially a right angle is formed between the elongated longitudinal axis of said pen and said first wall, said cartridge having at least one additional substantially plane outer wall that is positioned to extend at an obtuse angle away from said first mentioned wall, said writing tip portion of said fiber tip pen being arranged to extend substantially to the plane that includes said second mentioned wall of said cartridge, said fiber tip pens of each of said markers extending in a converging manner toward each other into substantially point to point contact with said chart whereby a record of each variable can simultaneously be recorded on substantially the same time line of said chart.

7. The apparatus as defined in claim 2 wherein said first one of said markers is mounted for back and forth transverse movement with a first carriage along said recording medium while it records the magnitude of a first variable Y on a Y axis of said recording medium and while the carriage is moved in a longitudinal direction along the X axis at a preselected time rate to thereby effect the recording of an X-Y plot thereon and said second marker is mounted for movement in a longitudinal direction along the X axis at said preselected time rate and for back and forth transverse movement along a second carriage while it records a second variable along substantially the same Y axis of said recording medium as that on which the record of the first variable is being made and thereby effect the plot of the X-Y' record thereon.

8. The apparatus as defined in claim 3 wherein a first one of said markers is mounted for back and forth transverse movement with said first carriage along said recording medium while it records the magnitude of a first variable Y on a Y axis of said recording medium and while the carriage is moved at a time rate in a longitudinal direction along the X axis in accordance with the magnitude of an independent variable and said second marker is mounted for movement in a longitudinal direction along the X axis at said preselected time rate and for back and forth transverse movement along a second carriage while it records the magnitude of a second variable Y' along substantially the same Y axis of said recording medium as that on which the record of the first variable is being made.

* * * * *